US010427742B2

(12) United States Patent
Osada et al.

(10) Patent No.: US 10,427,742 B2
(45) Date of Patent: Oct. 1, 2019

(54) INTEGRATED BICYCLE FRAME BAG

(71) Applicant: Bell Sports, Inc., Scotts Valley, CA (US)

(72) Inventors: Tad Osada, Dublin, CA (US); Kelvin Koo, Tsing Yi (HK); Roxanne Lo, Bonny Doon, CA (US); Tom Morgan, Santa Cruz, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 0 days.

(21) Appl. No.: 15/818,615

(22) Filed: Nov. 20, 2017

(65) Prior Publication Data

US 2018/0141606 A1     May 24, 2018

Related U.S. Application Data

(60) Provisional application No. 62/423,994, filed on Nov. 18, 2016.

(51) Int. Cl.
*B62J 9/00*     (2006.01)
*B62K 19/40*     (2006.01)

(52) U.S. Cl.
CPC .............. *B62J 9/005* (2013.01); *B62K 19/40* (2013.01)

(58) Field of Classification Search
CPC ............ B62J 9/005; B62J 9/003; B62K 19/40
USPC ........................................................ 224/438
See application file for complete search history.

(56) References Cited

U.S. PATENT DOCUMENTS

| | | | | |
|---|---|---|---|---|
| 444,642 A | * | 1/1891 | Allen, Jr. ................. | B62J 9/005 224/426 |
| 522,186 A | * | 7/1894 | Andrews ................. | B62J 9/003 224/439 |
| 575,536 A | * | 1/1897 | Swanson ................. | B62J 9/005 224/426 |
| 1,362,162 A | * | 12/1920 | Bradley ................... | B62J 9/005 224/426 |
| 1,485,067 A | * | 2/1924 | Bristol ..................... | B62J 9/005 224/426 |
| 2,710,084 A | * | 6/1955 | Braverman ........... | A45C 7/0036 190/107 |

(Continued)

FOREIGN PATENT DOCUMENTS

| | | | | |
|---|---|---|---|---|
| CA | 2704358 A1 | * | 11/2010 | ............. B62J 9/005 |
| CN | 102907856 | | 2/2013 | |

(Continued)

*Primary Examiner* — Nathan J Newhouse
*Assistant Examiner* — Lester L Vanterpool
(74) *Attorney, Agent, or Firm* — Booth Udall Fuller, PLC (57) ABSTRACT

A bicycle frame bag includes a bag body, a first frame and a second frame. The bag body includes a bag top, a bag bottom, a first bag side and a second bag side opposite the first bag side, the first bag side connecting with the bag top and the bag bottom at first edges, the second bag side connecting with the bag top and the bag bottom at second edges opposite the first edges. The first frame includes at least a first arm and a second arm operatively coupled to each other to form a first angle that is substantially the same as an angle between two adjacent tubes of a bicycle frame. The second frame includes at least a third arm and a fourth arm operatively coupled to each other to form a second angle that is substantially the same as the angle between the two adjacent tubes.

20 Claims, 11 Drawing Sheets

(56) References Cited

U.S. PATENT DOCUMENTS

| | | | | | |
|---|---|---|---|---|---|
| 3,837,546 | A | * | 9/1974 | Westermann | B62J 9/005 224/426 |
| 4,383,142 | A | * | 5/1983 | Kaneko | A45C 13/36 190/126 |
| 4,449,653 | A | * | 5/1984 | Pirolli | B62J 9/02 224/426 |
| 4,720,027 | A | * | 1/1988 | Board | B62J 9/005 224/426 |
| 5,031,807 | A | * | 7/1991 | Tiffany | B62J 9/005 150/108 |
| 5,071,046 | A | * | 12/1991 | Miller | A45F 3/02 224/585 |
| D331,557 | S | * | 12/1992 | Hurt | D12/409 |
| 5,249,721 | A | * | 10/1993 | Brooks | B62J 9/005 224/417 |
| D366,446 | S | * | 1/1996 | Berman | D12/409 |
| D366,447 | S | * | 1/1996 | Berman | D12/409 |
| 5,788,134 | A | * | 8/1998 | Matic, Jr. | B62J 11/00 224/414 |
| 5,823,557 | A | * | 10/1998 | Penza | B62J 7/00 280/304.5 |
| 6,253,979 | B1 | * | 7/2001 | Samson | B62J 9/005 224/426 |
| 6,401,997 | B1 | * | 6/2002 | Smerdon, Jr. | B62J 11/00 224/414 |
| 7,819,413 | B2 | * | 10/2010 | White | B62J 9/005 224/425 |
| 7,988,175 | B2 | * | 8/2011 | White | B62J 9/001 224/425 |
| 9,266,004 | B2 | * | 2/2016 | Shirk, II | A63B 63/00 |
| 9,452,800 | B1 | * | 9/2016 | Dixon | B62J 11/00 |
| 2010/0012696 | A1 | * | 1/2010 | Prager | B62J 9/005 224/417 |
| 2010/0084422 | A1 | | 4/2010 | Robota | |
| 2012/0193382 | A1 | * | 8/2012 | Wilson | B62J 9/005 224/414 |
| 2014/0291368 | A1 | * | 10/2014 | Scolari | B62J 11/00 224/418 |

FOREIGN PATENT DOCUMENTS

| | | | | |
|---|---|---|---|---|
| DE | 19723887 C1 | * | 11/1998 | ............ B62J 9/005 |
| DE | 202011003063 U1 | * | 5/2011 | ............ B62J 9/005 |
| RU | 2137412 | | 9/1999 | |
| RU | 2505411 | | 1/2014 | |
| WO | 2015022554 | | 2/2015 | |
| WO | WO-2015022554 A2 | * | 2/2015 | ............ B62K 19/16 |

* cited by examiner

INTEGRATED BICYCLE FRAME BAG

RELATED APPLICATIONS

This application is based on, claims priority to, and incorporates herein by reference in its entirety, U.S. Provisional Patent Application Ser. No. 62/423,994, filed on Nov. 18, 2016, and entitled "INTEGRATED BICYCLE FRAME BAG."

TECHNICAL FIELD

Aspects of this document relate generally to bicycle frame bags, and more specifically to bicycle frame bags that can be installed onto bicycle frames and methods of installing a bicycle frame bag.

BACKGROUND

Bags are needed to hold accessories or other objects on to the bicycle. It is desirable that, when installed on the bicycle, the bag stays with the bicycle and does not bounce around or up and down such that the bag does not interfere with the riding, especially during intensive mountain-bicycle riding. A Bicycle bag is often attached to the bicycle through additional fasteners such as straps or hook-and-loop fasteners. These fasteners provide places for water, mud, or dirt to collect and build up on the bag from riding. The build-up mud or dirt is hard to clean and also scratches the paint on the bicycle when the mud or dirt bounces with the bag and rubs against the bicycle frame during riding. Further, the failure of the fasteners causes the bag to lose all of its utility as a non-interfering storage container.

SUMMARY

According to an aspect of the disclosure, a bicycle frame bag may comprise a bag body, a first frame, a second frame, at least a first stitch line, and at least a second stitch line. The bag body may include a bag top, a bag bottom, a first bag side and a second bag side opposite the first bag side, the first bag side connecting with the bag top and the bag bottom at first edges, the second bag side connecting with the bag top and the bag bottom at second edges opposite the first edges. The first frame may include at least a first arm and a second arm operatively coupled to each other to resiliently maintain a first angle between the first and second arms that is substantially the same as an angle between two adjacent tubes of a bicycle frame, the first frame positioned adjacent to the first edges of the first bag side of the bag body. The second frame may include at least a third arm and a fourth arm operatively coupled to each other to resiliently maintain a second angle between the third and fourth arms that is substantially the same as the angle between the two adjacent tubes of the bicycle frame, the second frame positioned adjacent to the second edges of the second bag side of the bag body. The at least a first stitch line may be disposed across at least a portion of the bag top between the first and second frames, a dimension of the portion of the bag top along the at least a first stitch line narrowing to less than a dimension of the bag top adjacent to the first and second edges. The at least a second stitch line may be disposed across at least a portion of the bag bottom between the first and second frames, a dimension of the portion of the bag bottom along the at least a second stitch line narrowing to less than a dimension of the bag bottom adjacent to the first and second edges.

Particular embodiments may comprise one or more of the following. The bicycle frame bag may further comprise a fin extending outward from the bicycle frame bag and comprise a recess on a rear side of the fin positioned and sized to receive a shock pivot support into the recess. The bicycle frame bag may further comprise a fin made of a polyethylene board. The bicycle frame bag may further comprise a fin directly connected to the bag top at a first location and a second location with the fin disconnected from the bag top between the first location and the second location, the fin adapted to resiliently bias against a shock pivot support when installed between two adjacent tubes of a bicycle frame having the shock pivot support. At least one of the first arm and the second arm may have a length greater than a dimension of an opening defined by tubes of the bicycle frame. The bag body may comprise ethylene-vinyl acetate foam. The bicycle frame bag may further comprise a grip texture on an exterior of the bag top and the bag bottom. The at least a first stitch line may comprise at least two first stitch lines each spaced equally from the respective first and second edges on the bag top. The at least a second stitch line may comprise at least two second stitch lines each spaced equally from the respective first and second edges on the bag bottom.

According to an aspect of the disclosure, a bicycle frame bag may comprise a bag body, a first frame and a second frame. The bag body may include a bag top, a bag bottom, a first bag side and a second bag side opposite the first bag side, the first bag side connecting with the bag top and the bag bottom at first edges, the second bag side connecting with the bag top and the bag bottom at second edges opposite the first edges. The first frame may include at least a first arm and a second arm operatively coupled to each other to form a first angle between the first and second arms that is substantially the same as an angle between two adjacent tubes of a bicycle frame, the first frame positioned adjacent to the first edges of the first bag side of the bag body. The second frame may include at least a third arm and a fourth arm operatively coupled to each other to form a second angle between the third and fourth arms that is substantially the same as the angle between the two adjacent tubes of the bicycle frame, the second frame positioned adjacent to the second edges of the second bag side of the bag body.

Particular embodiments may comprise one or more of the following. The bicycle frame bag may further comprise at least a first stitch line disposed across at least a portion of the bag top between the first and second frames, a dimension of the portion of the bag top along the at least a first stitch line narrowing to less than a dimension of the bag top adjacent to the first and second edges. At least a second stitch line may be disposed across at least a portion of the bag bottom between the first and second frames, a dimension of the portion of the bag bottom along the at least a second stitch line narrowing to less than a dimension of the bag bottom adjacent to the first and second edges. The at least a first stitch line may comprise at least two first stitch lines each spaced equally from the respective first and second edges on the bag top. The at least a second stitch line may comprise at least two second stitch lines each spaced equally from the respective first and second edges on the bag bottom. The bicycle frame bag may further comprise a fin extending outward from the bicycle frame bag and comprise a recess on a rear side of the fin positioned and sized to receive a shock pivot support into the recess. The bicycle frame bag may further comprise a fin made of a polyethylene board. The bicycle frame bag may further comprise a fin directly connected to the bag top at a first location and a second location with the fin disconnected from the bag top between the first location and the second location, the fin adapted to resiliently bias against a shock pivot support when installed between two adjacent tubes of a bicycle frame having the shock pivot support. At least one of the first arm and the second arm may have a length greater than a dimension of an opening defined by tubes of the bicycle frame. The bag body may comprise ethylene-vinyl acetate foam. The bicycle frame bag may further comprise a grip texture on an exterior of the bag top and the bag bottom.

According to an aspect of the disclosure, a method of installing a bicycle frame bag onto a bicycle may comprise providing a bicycle frame bag including a bag body, a first frame, and a second frame. The first frame may include at least a first arm and a second arm operatively coupled to each other to form a first angle between the first and second arms that is substantially the same as an angle between two adjacent tubes of a bicycle frame on to which the bicycle frame bag is intended to be installed. The first frame may be positioned adjacent to first edges of a first side of the bag body. The second frame may include at least a third arm and a fourth arm operatively coupled to each other to form a second angle between the third and fourth arms that is substantially the same as the angle between the two adjacent tubes of the bicycle frame. The second frame may be positioned adjacent to second edges of a second side of the bag body opposite the first side. The first and second sides may be not immediately adjacent to each other. The first and second arms may resiliently maintain the first angle. The method may further comprise applying pressure to the first and second arms to temporarily reduce the first angle between the first and second arms. The method may further comprise placing the bicycle frame bag into an opening of the bicycle frame partially formed by the two adjacent tubes of the bicycle frame by passing the first and second arms into the opening past a midpoint of the opening. The method may further comprise releasing the pressure to the first and second arms to position the first and second arms and the third and fourth arms along the two adjacent tubes, respectively on opposing sides of the two adjacent tubes to seat the bicycle frame bag on the bicycle.

Particular embodiments may comprise one or more of the following. The method of installing a bicycle frame bag onto a bicycle may further comprise engaging a fin, extending from a top of the bicycle frame bag positioned between the first and second sides, with a shock pivot support of the bicycle such that the shock pivot support is received in a recess of the fin. The method may further comprise engaging a fin, extending from a top of the bicycle frame bag positioned between the first and second sides where the fin is not directly connected to the top of the bicycle frame bag between first and second locations where it is directly connected, with a shock pivot support of the bicycle such that the fin is biased against the shock pivot support after the bicycle frame bag is seated on the bicycle.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶ 6. Thus, the use of the words "function," "means" or "step" in the Detailed Description or Description of the Drawings or claims is not intended to somehow indicate a desire to invoke the special provisions of 35 U.S.C. § 112, ¶ 6, to define the invention. To the contrary, if the provisions of 35 U.S.C. § 112, ¶ 6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material, or acts in support of the function. Thus, even when the claims recite a "means for performing the function of . . . " or "step for performing the function of . . . ," if the claims also recite any structure, material, or acts in support of that means or step, or to perform the recited function, it is the clear intention of the inventors not to invoke the provisions of 35 U.S.C. § 112, ¶ 6. Moreover, even if the provisions of 35 U.S.C. § 112, ¶ 6, are invoked to define the claimed aspects, it is intended that these aspects not be limited only to the specific structure, material, or acts that are described in the preferred embodiments, but in addition, include any and all structures, material, or acts that perform the claimed function as described in alternative embodiments or forms in the disclosure, or that are well-known present or later-developed, equivalent structures, material, or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DETAILED DESCRIPTION

While this disclosure includes embodiments in many different forms, they are shown in the drawings and will herein be described in detailed particular embodiments with the understanding that the present disclosure is to be considered as an exemplification of the principles of the disclosed methods and systems, and is not intended to limit the broad aspect of the disclosed concepts to the embodiments illustrated.

Bags for storage are used in many applications in the bicycle industry, to store repair or personal items. Although these bags come in a wide variety of sizes and shapes, during riding especially competitive bicycle racing, desirable bags do not interfere with the movement and momentum of the bicyclist. The interference can come in the form of additional weight being carried by the bicyclist, or bags being placed in areas such that the bag causes a drag on the aerodynamics or interferes with the pedaling action of the bicyclist.

Contemplated as part of this disclosure is a bicycle frame bag that can be placed onto a bicycle frame without additional fasteners, as well as a method of installing a bicycle frame bag onto a bicycle. Placing a bicycle frame bag within the opening defined by the bicycle frame allows the bicyclist to carry necessary items without interference from the bag in the pedaling action or riding aerodynamics.

The bicycle frame bag, as disclosed herein, does not require additional fastener to attach the bag onto the bicycle. As a result, there is no fastener that would catch water, mud, or dirt and, therefore, the bag is easy to clean or stay clean and scratches to the tubes of the bicycle caused by the built-up mud or dirt can be limited. The frame bag may be configured to work with a specific frame mode, or in the alternative, the frame bag is not limited to a specific model of bicycles, and can fit most bicycle frames.

Figure 1:
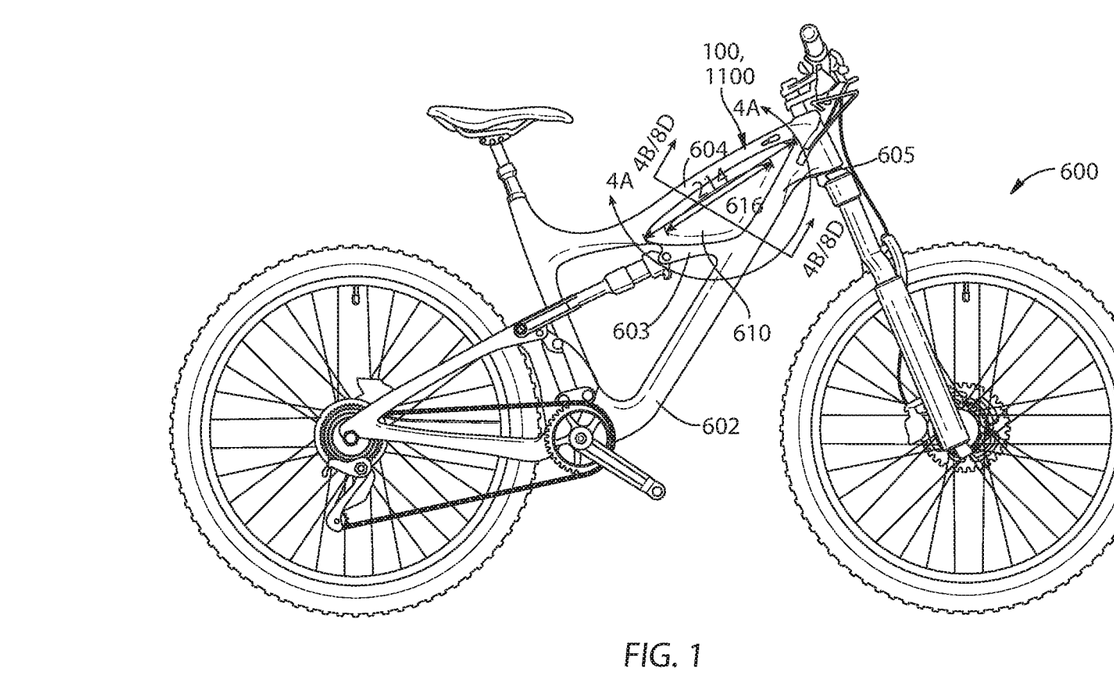
FIG. 1 is a side view of a bicycle frame bag installed onto a bicycle.
Figure 5:
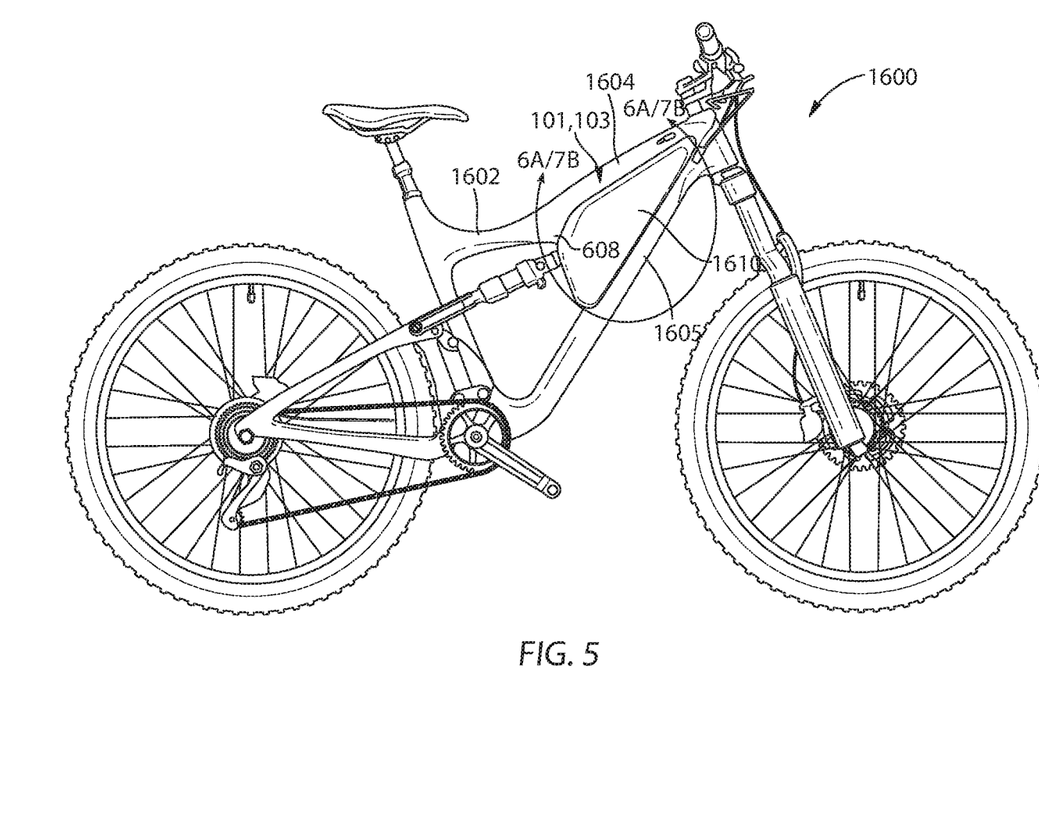
FIG. 5 shows another non-limiting embodiment of a bicycle frame bag when installed on a bicycle.
Figure 6A:
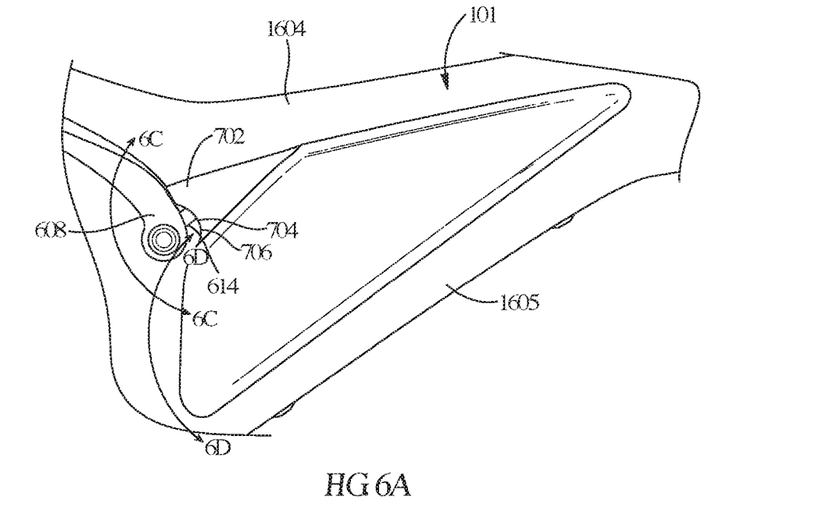
FIG. 6A shows a partial side perspective view of one embodiment of the bicycle frame bag shown in FIG. 5, when installed on a bicycle, taken at the section line 6A-6A of FIG. 5.
Figure 6B:
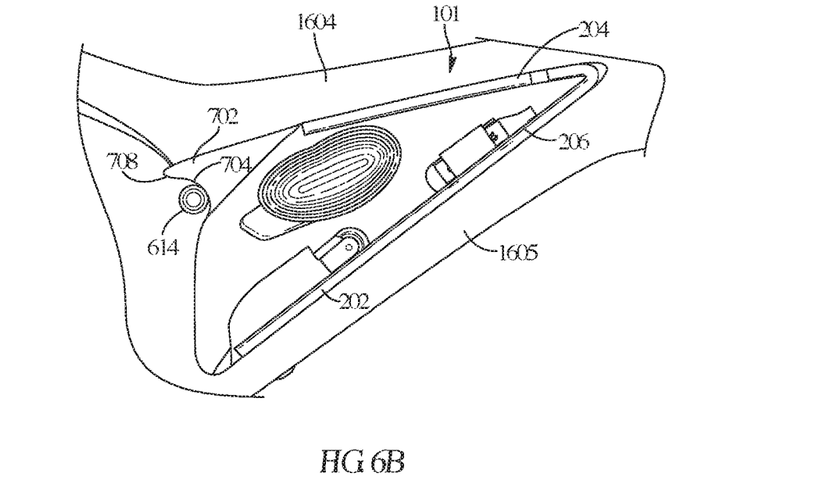
FIG. 6B shows a partial cross-sectional view of the bicycle frame bag shown in FIG. 6A, when installed on a bicycle.
Figure 6C:
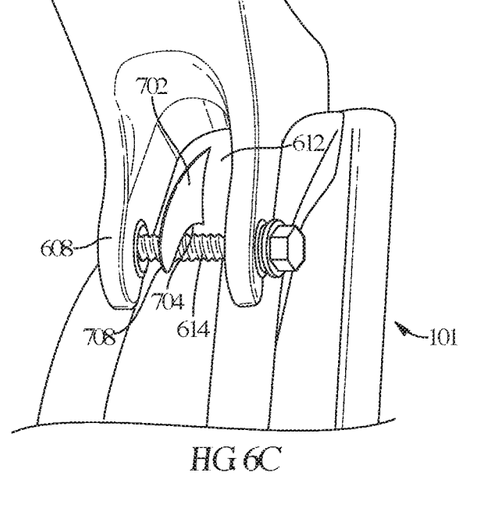
FIG. 6C shows a partial rear view of the bicycle frame bag shown in FIG. 6A, when installed on a bicycle, taken along section line 6C-6C of FIG. 6A.
Figure 6D:
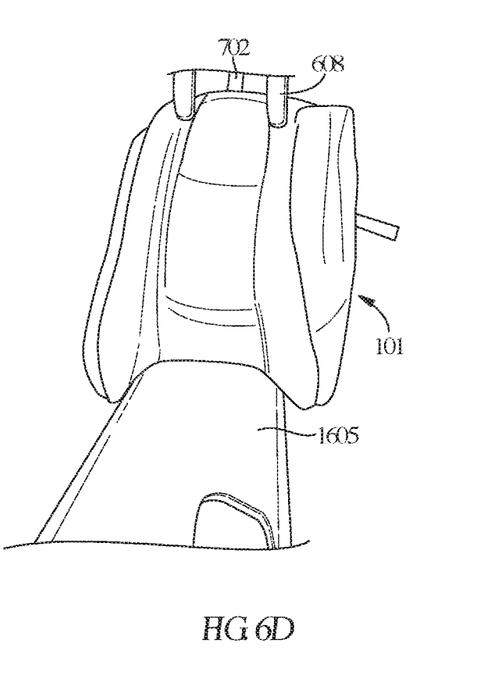
FIG. 6D shows a partial rear view of the bicycle frame bag shown in FIG. 6A, when installed on a bicycle, taken along section line 6D-6D of FIG. 6A.
Figure 7A:
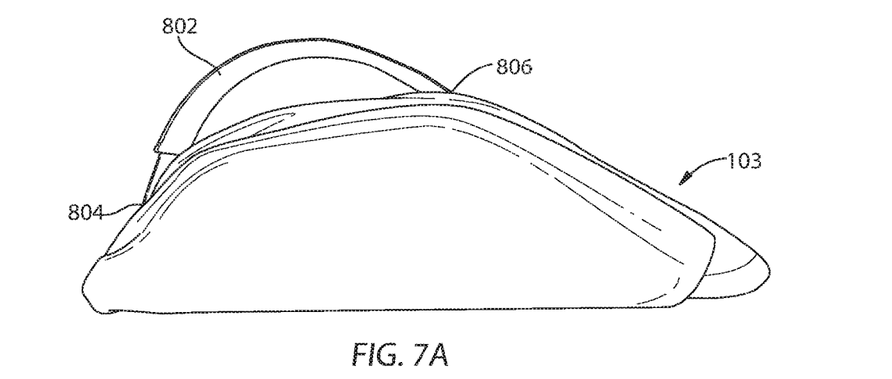
FIG. 7A shows a side view of one more embodiment of the bicycle frame bag shown in FIG. 5.
Figure 7B:
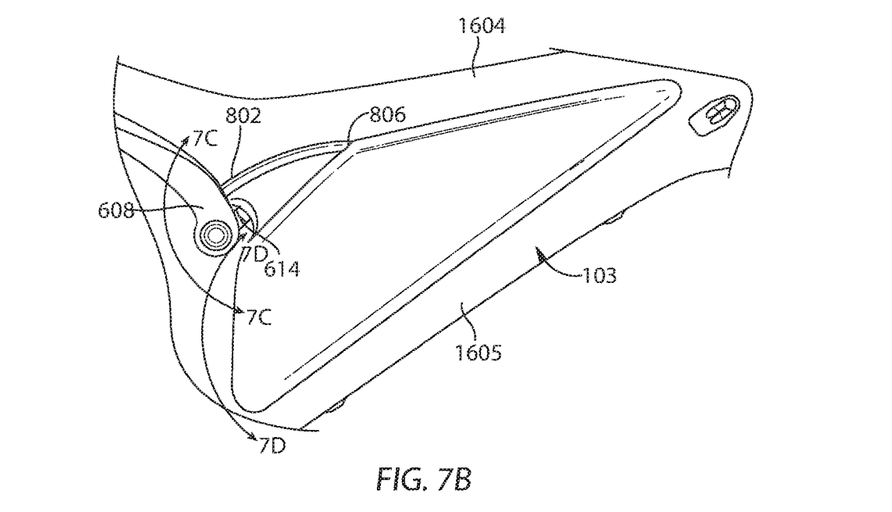
FIG. 7B shows a partial side perspective view of the bicycle frame bag shown in FIG. 7A, when installed on the bicycle, taken along section line 7B-7B of FIG. 5.
Figure 7C:
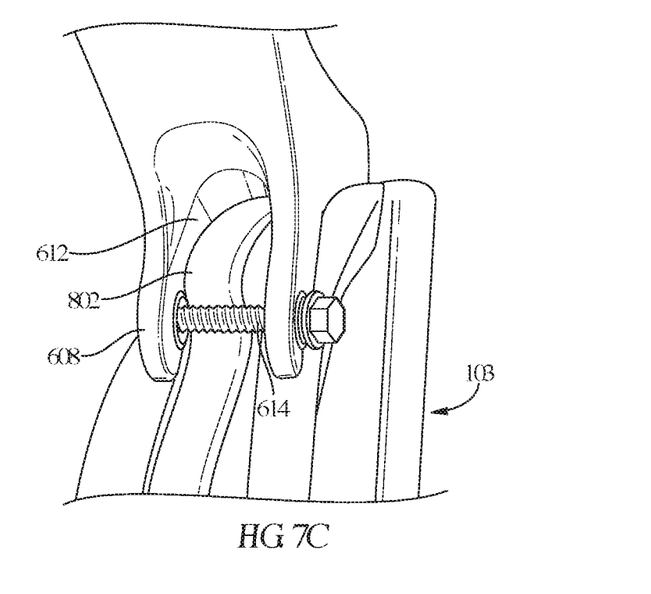
FIG. 7C shows a partial rear view of the bicycle frame bag shown in 7A, when installed on a bicycle, taken along section line 7C-7C of FIG. 7B.
Figure 7D:
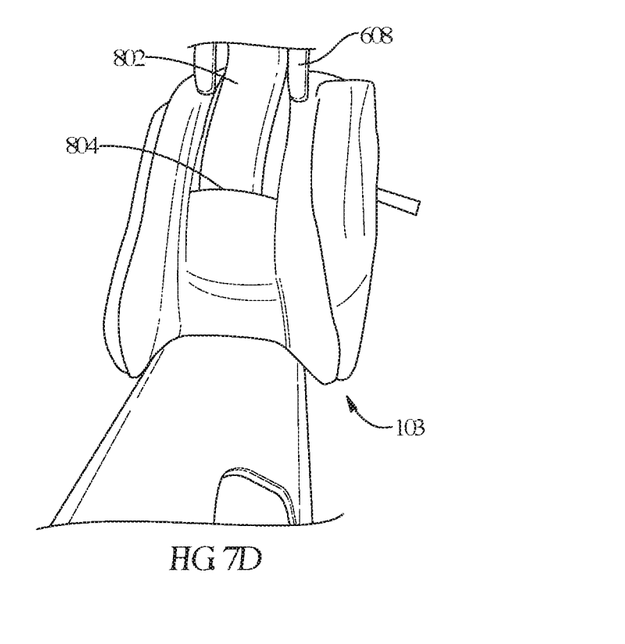
FIG. 7D shows a partial rear view of the bicycle frame bag shown in FIG. 7A, when installed on a bicycle, taken along section line 7D-7D of FIG. 7B.

FIGS. 1 and 5 illustrate examples of a bicycle frame bag 100, 101 or 103 being installed onto a bicycle 600, 1600. The tubes 603, 604, 605 of bicycle 600 (FIG. 1) form a closed opening 610 through the bike frame with a closed border, while the tubes 1604, 1605 of bicycle 1600 (FIG. 5) form an opening with an open border. Frame bags disclosed herein can be fitted onto either type of bicycles.

In the particular embodiments illustrated in FIGS. 1-8D, the bicycle frame bag or frame bag 100, 101, 103, 1100 comprises a bag body 102, a first frame 202, and a second frame 302. The first and second frames 202 and 302 are resilient. FIG. 2A shows the side view of an example frame bag 100 and FIG. 2B shows the top perspective view of the example frame bag 100. The bicycle frame bag 100, 101, 103, 1100 may further comprise at least a first stitch line 402, and in some embodiments, at least a second stitch line 502. In some embodiments, the first stitch line 402 is centered between the first and second frames 202 and 302. In other embodiments, the first and second stitch lines 402, 502 are spaced from each other between the first and second frames 202 and 302. The bag body 102 includes a bag top 106, a bag bottom 108, a first bag side 114, and a second bag side 116 opposite the first bag side 114. The first bag side connects with the bag top 106 and the bag bottom 108 at first edges 110. The second bag side 116 connects with the bag top 106 and the bag bottom 108 at second edges 112.

The first frame 202 includes at least a first arm 204 and a second arm 206 operatively coupled to each other to resiliently maintain a first angle 208 between the first and second arms 204, 206. The first angle 208 may be substantially the same as an angle 210 between two adjacent tubes 604, 605 of a bicycle frame 602. The differences between the first angle 208 and the angle 210 may be 0, 2°, 5°, 7°, 10°, or any angle less than 10°. The first frame 202 may be positioned adjacent to the first edges 110 of the first bag side 114 of the bag body 102.

The second frame 302 may include at least a third arm 304 and a fourth arm 306 operatively coupled to each other to resiliently maintain a second angle 308 between the third and fourth arms 304, 306. The second angle 308 may be substantially the same as the angle 210 between the two adjacent tubes 604, 605. The differences between the second angle 308 and the angle 210 may be 0, 2°, 5°, 7°, 10°, or any angle less than 10°. The second frame 302 may be positioned adjacent to the second edges 112 of the second bag side 116 of the bag body 102.

Figure 4A:
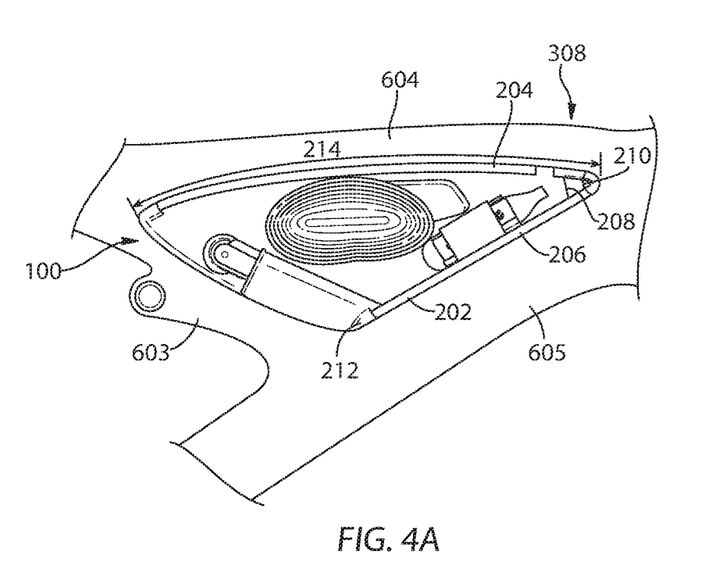
FIG. 4A shows a partial cross-sectional view of the bicycle frame bag shown in FIG. 1 when installed onto a bicycle, taken along cross-section line 4A-4A of FIG. 1.
Figure 4B:
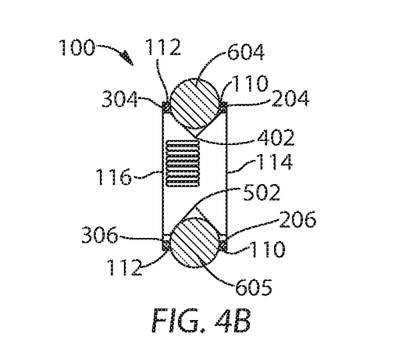
FIG. 4B shows a cross-sectional view of the bicycle frame bag installed on a bicycle, taken along cross-section line 4B-4B of FIG. 1.

In some embodiments, at least one of the first arm 204 and the second arm 206 has a length greater than a corresponding dimension of an opening 610 defined by tubes 603, 604, and 605 of the bicycle frame 602 (FIGS. 1 and 4A). For example, the length 214 of the first arm 204 of a bicycle frame bag 100 is greater than the length 616 of the side of opening 610 along tube 604 of the bicycle frame 602. In some embodiments, at least one of the third arm 304 and the fourth arm 306 has a length greater than a corresponding dimension of an opening 610 defined by tubes 603, 604, and 605. As a result, the frames can be positioned outside of the opening of bicycle while the frame bag is mounted on the bicycle frame.

The first and second frames 202 and 302 may comprise any material known in the art such as, but not limited to, resilient plastics, polymers, metals, alloys, carbon, carbon fibers, fiberglass, or any other resilient materials that can be formed into a frame and allow for the frame deformation needed to fit the frame bag within the opening of a bicycle frame, that still resiliently rebounds to its original shape when released. In some embodiments, the frame is flexible enough for a user to manually deform the frame so that the angle between the adjacent arms, such as between the first and second arms or between the third and fourth arms, is decreasable by a small amount less than 10°, or any other amount needed, to allow the frame and the bag side can fit within the bicycle frame and, when released, expand to fit the opening of the bicycle frame. From this explanation, those of ordinary skill in the art will understand the types of materials from which the resilient frames may be formed.

Figure 2A:
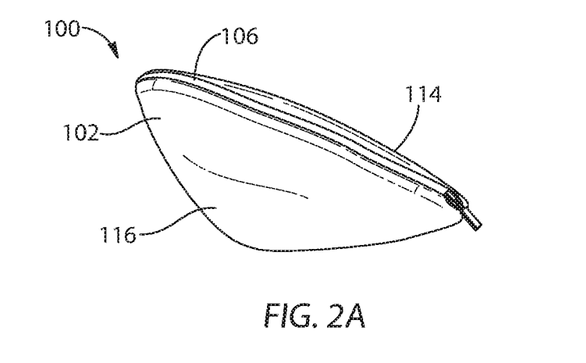
FIG. 2A shows a side view of the bicycle frame bag shown in FIG. 1.
Figure 2B:
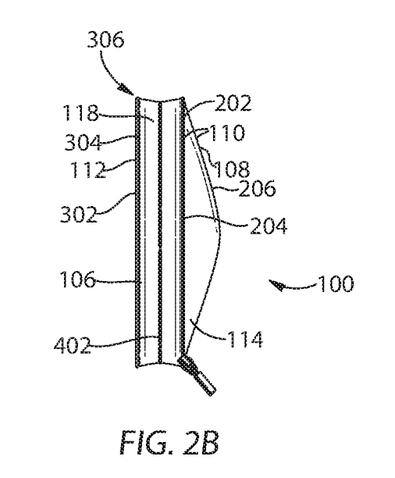
FIG. 2B shows a top perspective view of the bicycle frame bag shown in FIG. 2A.
Figure 3A:
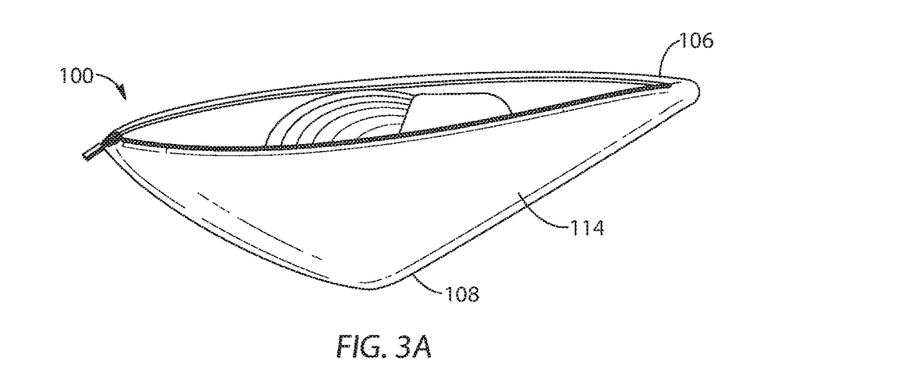
FIG. 3A shows a side view of the bicycle frame bag shown in FIG. 1, with the top open.
Figure 3B:
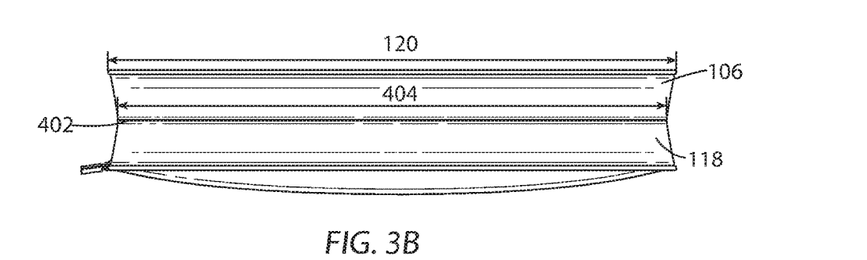
FIG. 3B shows a top view of the bicycle frame bag shown in FIG. 3A.
Figure 3C:
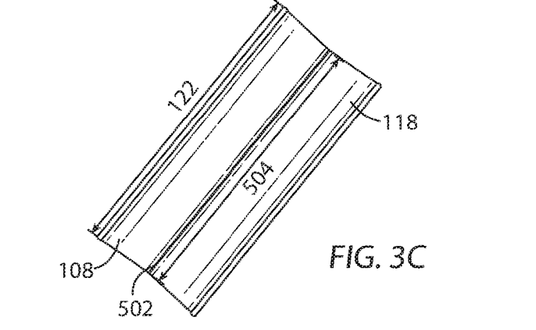
FIG. 3C shows a right bottom side view of the bicycle frame bag shown in FIG. 3A.

At least a first stitch line 402 may be disposed across at least a portion of the bag top 106 between the first and second frames 202 and 302. At least a second stitch line 502 may be disposed across at least a portion of the bag bottom 108 between the first and second frames 202 and 302. In some embodiments, the first stitch line is disposed in the middle of the bag top 106 between the first and second edges 110 and 112 and the second stitch line is disposed in the middle of the bag bottom 108 between the first and second edges 110 and 112 (FIGS. 2B, 3B, and 3C). FIGS. 2A-4B show various views of an example frame bag 100. FIG. 3B shows the top view of the example frame bag 100 showing a first stitch line 402 disposed on the bag top 106 and FIG. 3C shows a right bottom view of the example frame bag 100 showing a second stitch line 502 disposed on the bag bottom 108.

Figure 8A:
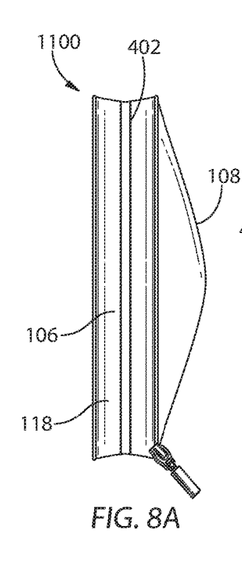
FIG. 8A shows a top perspective view of yet another non-limiting embodiment of a bicycle frame bag.
Figure 8B:
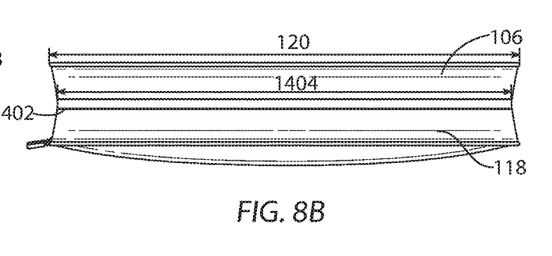
FIG. 8B shows a top view of the bicycle frame bag shown in FIG. 8A.
Figure 8C:
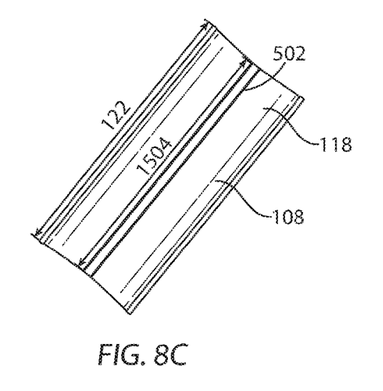
FIG. 8C shows a right bottom side view of the bicycle frame bag shown in FIG. 8A.
Figure 8D:
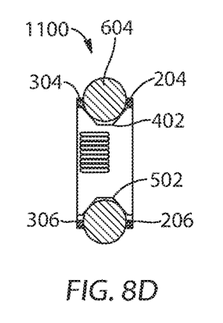
FIG. 8D shows a cross-sectional view of the bicycle frame bag shown in FIG. 8A installed on a bicycle taken along cross-section line 8D-8D of FIG. 1.

In some embodiments, the at least a first stitch line 402 comprises at least two first stitch lines 402 and the at least a second stitch line 502 comprises at least two second stitch lines 502. The first stitch lines 402 may each be spaced equally from the respective first and second edges 110 and 112 on the bag top 106 (FIGS. 8A-8D). The second stitch lines 502 may each be spaced equally from the respective first and second edges 110 and 112 on the bag bottom 108. FIG. 8B shows the top view of an example frame bag 1100 showing the first stitch lines 402 on the bag top 106 and FIG. 8C shows the right bottom view of the example frame bag 1100 showing the second stitch lines 502 on the bag bottom 108.

A dimension of the portion of the bag top 106 along the at least a first stitch line 402 may narrow to less than a dimension of the bag top 106 adjacent to the first and second edges 110 and 112. A dimension of the portion of the bag bottom 108 along the at least a second stitch line 502 may also narrow to less than a dimension of the bag bottom 108 adjacent to the first and second edges 110 and 112. In some embodiments where the frame bag 100 comprises one first stitch line 402 on the bag top 106 and one second stitch line 502 on the bag bottom 108, the length 404 of the first stitch line 402 is less than the length 120 of the bag top 106 and the length 504 of the second stitch line 502 is less than the length 122 of the bag bottom 108 (FIGS. 3B-3C). In some embodiments where the frame bag 1100 comprises two or more first stitch lines 402 on the bag top 106 and two or more second stitch lines 502 on the bag bottom 108, the length 1404 of any first stitch line 402 is less than the length 120 of the bag top 106 and the length 1504 of any second stitch line 502 is less than the length 122 of the bag bottom 108 (FIGS. 8B-8C).

With the dimensions of the first stitch lines smaller than the dimension of the bag top and the dimensions of the second stitch lines smaller than the dimension of the bag bottom, when the frame bag is place onto the bicycle frame of a bicycle, the frames of the bicycle frame bag are positioned outside the opening of the bicycle frame such that the arms of the frames are positioned on the sides of the tubes of the bicycle and the bag top and bag bottom are disposed along the tubes of the bicycle frame (FIGS. 4B, 6D, 7D, and 8D). For example, in FIGS. 4B, 6D, 7D, and 8D, the first arm 204 and the third arm 304 are positioned on the opposing sides of the tube 604, 1604, and the second arm 206 and the fourth arm 306 are positioned on the opposing sides of the tube 605, 1605. The first and second stitch lines, in combination with the bag frames, help center the frame bag on the bicycle frame and allow the bag to fit onto the bicycle frame. The stitch lines and the arms form a "v"-like shape nestling around the tubes of the bicycle frame and cause tension between the frames and bag top or bottom to hold the bag in place on the bicycle frame.

The bicycle frame bag may comprise an outer shell, zippers, pockets, support board, foam padding, elastic bands, and the like inside or outside the frame bag. These components help provide additional structure while keeping contents in place in the bag so not to interfere with the rider's knees. In some embodiments, the bag body 102 is made of material that is capable of holding its shape. In some embodiments, the bag body 102 comprises ethylene-vinyl acetate foams. A bicycle frame bag may further comprise a zipper, buttons, or other parts at the opening of the frame bag for easy access of the contents in the frame bag (FIG. 3A). A frame bag 100 may comprise one or more arm anchors 212 to receive an end of the arms 204, 206, 304, 306 (FIG. 4A). In some embodiments, the bicycle frame bag 100, 101, 103, 1100 further comprises a grip texture 118 on an exterior of the bag top 106 and the bag bottom 108 (FIGS. 2B, 3B, 3C, 8A-8C) to strengthen the hold of the frame bag onto the bicycle frame.

The bicycle frame bag 100 can be fitted into a closed opening 610 formed by tubes 603, 604, 605 of a bicycle 600 (FIG. 1). When the frame bag 100 is fitted onto the bicycle 600, the first frame 202 and the second frame 302 each rest on the opposing sides of a tube 603, 604, or 605 (FIG. 4B), and each of the bag top 106 and the bag bottom 108 rests on or against a tube.

When the tubes of the bicycle form an opening with an open border (example in FIG. 5), a fin can be used to help attach the frame bag onto the bicycle at the space defined by the bicycle frame. When a frame bag 101, 103 is placed on such a bicycle 1600, in addition to the first frame 202 and the second frame 302 each resting on opposing sides of a tube 1604, 1605, the fin 702, 802 rests against the shock pivot support of 608 of the bicycle 1600 and provides additional attachment to the bicycle frame 1602.

The bicycle frame bag 101, 103 may further comprise a fin 702, 802 (FIGS. 6A-7D). In some embodiments, the fin 702, 802 is made of a hard material, such as a polyethylene board. In some embodiments, the fin 702 extends outward from the bicycle frame bag 101 (FIGS. 6A-6D) and comprises a recess 704 on a rear side 706 of the fin 702. The recess 704 is positioned and sized to receive a shock pivot support 608 into the recess 704. For example, when the frame bag 101 is installed in the bicycle frame 1602 in the opening 1610 formed by the adjacent tubes 1604 and 1605 and the shock pivot support 608, the fin 702 is sized so that it can be positioned in the aperture 612 defined by the tube 1604 and the shock pivot support 608 and the tip 708 of the fin 702 can rest against the bolt 614 going through the shock pivot support 608 while the shock pivot support 608 is received in the recess 704. The fin 702 helps the frame bag 101 stay within the bicycle frame 1602. The fin 702 pushes against the bicycle frame 101 at the shock pivot support 608 to counter balance the gravity pull to the frame bag 101 so that the frame bag does not slide downward and slip out of the opening 1610.

In some embodiments, the bicycle frame bag 103 may comprise a fin 802 (FIGS. 7A-7D) that is directly connected to the bag top 106 at a first location 804 and a second location 806 while the fin 802 is disconnected from the bag top 106 between the first location 804 and the second location 806. The fin 802 is adapted to deform and resiliently bias against a shock pivot support 608 when installed between the two adjacent tubes 1604, 1605 of a bicycle frame 1602 having the shock pivot support 608. In some embodiments, the fin 802 is a resilient band attached to the bag top at the first and second locations 804 and 806. When the frame bag 103 is installed in the bicycle frame 1602 in the opening 1610 formed by the two adjacent tubes 1604 and 1605 and the shock pivot support 608, the fin 802 is pushed forward and biased against the shock pivot support 608 (FIGS. 7B-7D) on a rear side of the fin 802. The tension created by the biased fin 802 counter balances the gravity pull to the frame bag 103 and helps the frame bag 103 stay in the opening 1610 by providing additional attachment.

Figure 9:
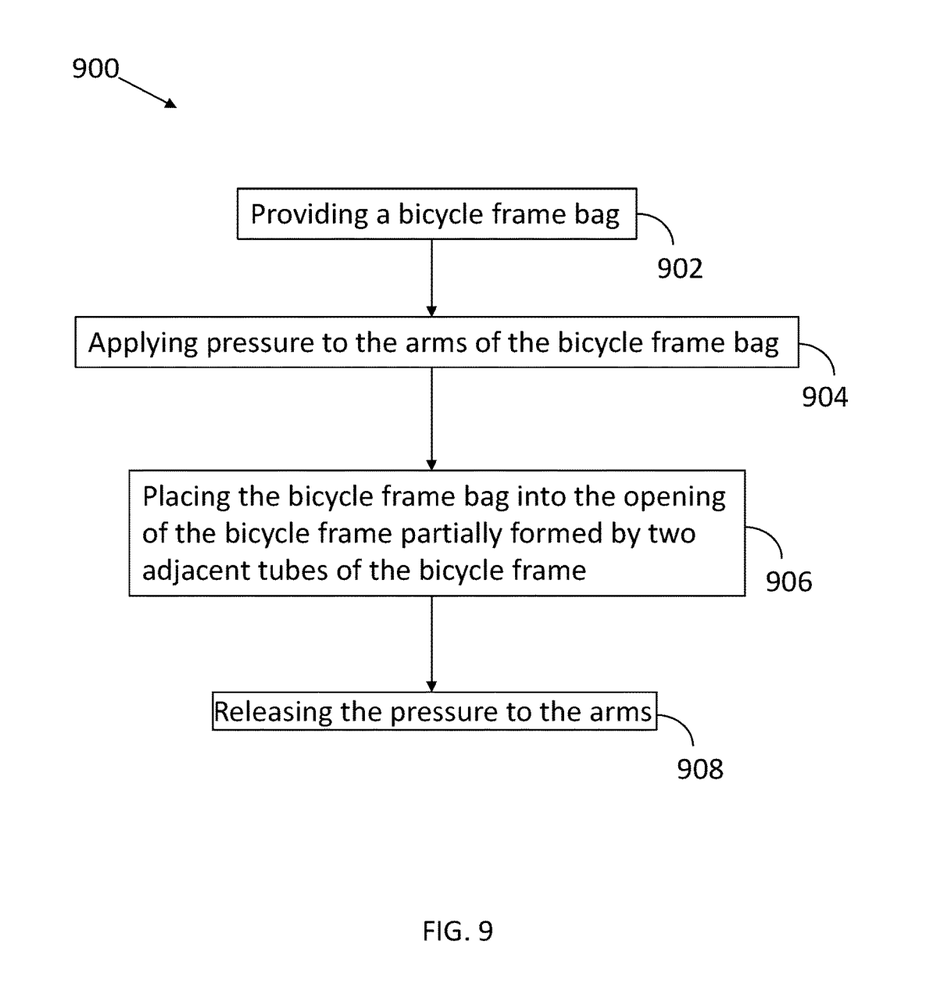
FIG. 9 is a flow chart of a method of installing a bicycle frame bag onto a bicycle.

Methods of installing a bicycle frame bag onto a bicycle are also provided herein. FIG. 9 illustrates an example of a method of installing a bicycle frame bag (900). The method (900) comprises providing a bicycle frame bag (902). The bicycle frame bag includes a bag body, a first frame, and a second frame. The first frame includes at least a first arm and a second arm operatively coupled to each other to form a first angle between the first and second arms. The first angle is substantially the same as the angle between two adjacent tubes of a bicycle frame on to which the bicycle frame bag is intended to be installed. The first frame is positioned adjacent to the first edges of a first side of the bag body. The second frame includes at least a third arm and fourth arms operatively coupled to each other to form a second angle between the third and fourth arms. The second angle is substantially the same as the angle between the two adjacent tubes of the bicycle frame. The second frame is positioned adjacent to second edges of a second side of the bag body opposite the first side. The first and second sides are not immediately adjacent to each other. The first and second arms resiliently maintain the first angle. The second and third arms may rigidly or resiliently maintain the second angle.

The method (900) further comprises applying pressure to the first and second arms of the bicycle frame bag to temporarily reduce the first angle between the first and second arms (904), placing the bicycle frame bag into the opening of the bicycle frame partially formed by the two adjacent tubes of the bicycle frame by passing the first and second arms into the opening past a midpoint of the opening (906), and releasing the pressure on the first and second arms to position the first and second arms and the third and fourth arms along the two adjacent tubes, respectively on opposing sides of the two adjacent tubes, respectively on opposing sides of the two adjacent tubes to seat the bicycle frame bag on the bicycle (908).

In some embodiments, the method (900) may further comprise engaging a fin, extending from a top of the bicycle frame bag positioned between the first and second sides, with a shock pivot support of the bicycle such that the shock pivot support is received in a recess of the fin. In some embodiments, the method (900) may further comprise engaging a fin, extending from a top of the bicycle frame bag positioned between the first and second sides where the fin is not directly connected to the top of the bicycle frame bag between the first and second locations where is it directly connected, with a shock pivot support of the bicycle such that the fin is biased against the shock pivot support after the bicycle frame bag is seated on the bicycle.

This disclosure, its aspects and implementations, are not limited to the specific components or assembly procedures disclosed herein. Many additional components and assembly procedures known in the art consistent with the bicycle frame bags, and methods of installing a bicycle frame bag will become apparent for use with implementations of the apparatus and methods in this disclosure. In places where the description above refers to particular implementations of bicycle frame bags, it should be readily apparent that a number of modifications may be made without departing from the spirit thereof and that these implementations may be applied to other bicycle frame bags. The presently disclosed implementations are, therefore, to be considered in all respects as illustrative and not restrictive, the scope of the disclosure being indicated by the appended claims rather than the foregoing description. All changes that come within the meaning of and range of equivalency of the description are intended to be embraced therein. Accordingly, for example, although particular bicycle frame bags and methods of installing a bicycle frame bag are disclosed, such apparatus, methods, and implementing components may comprise any shape, size, style, type, model, version, class, grade, measurement, concentration, material, quantity, the like as is known in the art for such apparatus, methods, and implementing components, and/or the like consistent with the intended operation of the bicycle frame bags, and methods of installing a bicycle frame bag that may be used.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

The invention claimed is:

1. A bicycle frame bag comprising:
    a bag body including a bag top, a bag bottom, a first bag side and a second bag side opposite the first bag side, the first bag side connecting with the bag top and the bag bottom at first edges, the second bag side connecting with the bag top and the bag bottom at second edges opposite the first edges;
    a first frame including at least a first arm and a second arm operatively coupled to each other to resiliently maintain a first angle between the first and second arms that is less than 10 degrees different from an angle between two adjacent tubes of a bicycle frame, the first frame positioned adjacent to the first edges of the first bag side of the bag body;

a second frame including at least a third arm and a fourth arm operatively coupled to each other to resiliently maintain a second angle between the third and fourth arms that is less than 10 degrees different from the angle between the two adjacent tubes of the bicycle frame, the second frame positioned adjacent to the second edges of the second bag side of the bag body;

at least a first stitch line disposed across at least a portion of the bag top between the first and second frames, a dimension of the portion of the bag top along the at least a first stitch line narrowing to less than a dimension of the bag top adjacent to the first and second edges; and at least a second stitch line disposed across at least a portion of the bag bottom between the first and second frames, a dimension of the portion of the bag bottom along the at least a second stitch line narrowing to less than a dimension of the bag bottom adjacent to the first and second edges.

2. The bicycle frame bag of claim 1, further comprising a fin extending outward from the bicycle frame bag and comprising a recess on a rear side of the fin positioned and sized to receive a shock pivot support into the recess.

3. The bicycle frame bag of claim 1, further comprising a fin made of a polyethylene board.

4. The bicycle frame bag of claim 1, further comprising a fin directly connected to the bag top at a first location and a second location with the fin disconnected from the bag top between the first location and the second location, the fin adapted to resiliently bias against a shock pivot support when installed between two adjacent tubes of a bicycle frame having the shock pivot support.

5. The bicycle frame bag of claim 1, wherein at least one of the first arm and the second arm has a length greater than a dimension of an opening defined by tubes of the bicycle frame.

6. The bicycle frame bag of claim 1, wherein the bag body comprises ethylene-vinyl acetate foam.

7. The bicycle frame bag of claim 1, further comprising a grip texture on an exterior of the bag top and the bag bottom.

8. The bicycle frame bag of claim 1, wherein the at least a first stitch line comprises at least two first stitch lines each spaced equally from the respective first and second edges on the bag top, and wherein the at least a second stitch line comprises at least two second stitch lines each spaced equally from the respective first and second edges on the bag bottom.

9. A bicycle frame bag comprising:
a fin extending outward from the bicycle frame bag and comprising a recess on a rear side of the fin positioned and sized to receive a shock pivot support into the recess;
a bag body including a bag top, a bag bottom, a first bag side and a second bag side opposite the first bag side, the first bag side connecting with the bag top and the bag bottom at first edges, the second bag side connecting with the bag top and the bag bottom at second edges opposite the first edges;
a first frame including at least a first arm and a second arm operatively coupled to each other to form a first angle between the first and second arms that is less than 10 degrees different from an angle between two adjacent tubes of a bicycle frame, the first frame positioned adjacent to the first edges of the first bag side of the bag body; and
a second frame including at least a third arm and a fourth arm operatively coupled to each other to form a second angle between the third and fourth arms that is less than 10 degrees different from the angle between the two adjacent tubes of the bicycle frame, the second frame positioned adjacent to the second edges of the second bag side of the bag body.

10. The bicycle frame bag of claim 9, wherein at least one of the first arm and the second arm has a length greater than a dimension of an opening defined by tubes of the bicycle frame.

11. The bicycle frame bag of claim 9, wherein the bag body comprises ethylene-vinyl acetate foam.

12. The bicycle frame bag of claim 9, further comprising a grip texture on an exterior of the bag top and the bag bottom.

13. A bicycle frame bag comprising:
a bag body including a bag top, a bag bottom, a first bag side and a second bag side opposite the first bag side, the first bag side connecting with the bag top and the bag bottom at first edges, the second bag side connecting with the bag top and the bag bottom at second edges opposite the first edges;
a first frame including at least a first arm and a second arm operatively coupled to each other to form a first angle between the first and second arms that is less than 10 degrees different from an angle between two adjacent tubes of a bicycle frame, the first frame positioned adjacent to the first edges of the first bag side of the bag body; and
a second frame including at least a third arm and a fourth arm operatively coupled to each other to form a second angle between the third and fourth arms that is less than 10 degrees different from the angle between the two adjacent tubes of the bicycle frame, the second frame positioned adjacent to the second edges of the second bag side of the bag body;
further comprising:
at least a first stitch line disposed across at least a portion of the bag top between the first and second frames, a dimension of the portion of the bag top along the at least a first stitch line narrowing to less than a dimension of the bag top adjacent to the first and second edges; and
at least a second stitch line disposed across at least a portion of the bag bottom between the first and second frames, a dimension of the portion of the bag bottom along the at least a second stitch line narrowing to less than a dimension of the bag bottom adjacent to the first and second edges.

14. The bicycle frame bag of claim 13, wherein the at least a first stitch line comprises at least two first stitch lines each spaced equally from the respective first and second edges on the bag top, and wherein the at least a second stitch line comprises at least two second stitch lines each spaced equally from the respective first and second edges on the bag bottom.

15. The bicycle frame bag of claim 13, wherein at least one of the first arm and the second arm has a length greater than a dimension of an opening defined by tubes of the bicycle frame.

16. A bicycle frame bag comprising:
a bag body including a bag top, a bag bottom, a first bag side and a second bag side opposite the first bag side, the first bag side connecting with the bag top and the bag bottom at first edges, the second bag side connecting with the bag top and the bag bottom at second edges opposite the first edges;

a first frame including at least a first arm and a second arm operatively coupled to each other to form a first angle between the first and second arms that is less than 10 degrees different from an angle between two adjacent tubes of a bicycle frame, the first frame positioned adjacent to the first edges of the first bag side of the bag body; and a second frame including at least a third arm and a fourth arm operatively coupled to each other to form a second angle between the third and fourth arms that is less than 10 degrees different from the angle between the two adjacent tubes of the bicycle frame, the second frame positioned adjacent to the second edges of the second bag side of the bag body;

further comprising a fin made of a polyethylene board.

17. A bicycle frame bag comprising:

a bag body including a bag top, a bag bottom, a first bag side and a second bag side opposite the first bag side, the first bag side connecting with the bag top and the bag bottom at first edges, the second bag side connecting with the bag top and the bag bottom at second edges opposite the first edges;

a first frame including at least a first arm and a second arm operatively coupled to each other to form a first angle between the first and second arms that is less than 10 degrees different from an angle between two adjacent tubes of a bicycle frame, the first frame positioned adjacent to the first edges of the first bag side of the bag body; and a second frame including at least a third arm and a fourth arm operatively coupled to each other to form a second angle between the third and fourth arms that is less than 10 degrees different from the angle between the two adjacent tubes of the bicycle frame, the second frame positioned adjacent to the second edges of the second bag side of the bag body;

further comprising a fin directly connected to the bag top at a first location and a second location with the fin disconnected from the bag top between the first location and the second location, the fin adapted to resiliently bias against a shock pivot support when installed between two adjacent tubes of a bicycle frame having the shock pivot support.

18. A method of installing a bicycle frame bag onto a bicycle, comprising:

providing a bicycle frame bag including a bag body, a first frame and a second frame, the first frame including at least a first arm and a second arm operatively coupled to each other to form a first angle between the first and second arms that is less than 10 degrees different from an angle between two adjacent tubes of a bicycle frame on to which the bicycle frame bag is intended to be installed, the first frame positioned adjacent to first edges of a first side of the bag body, the second frame including at least a third arm and a fourth arm operatively coupled to each other to form a second angle between the third and fourth arms that is less than 10 degrees different from the angle between the two adjacent tubes of the bicycle frame, the second frame positioned adjacent to second edges of a second side of the bag body opposite the first side, the first and second sides not immediately adjacent to each other, and the first and second arms resiliently maintaining the first angle;

applying pressure to the first and second arms to temporarily reduce the first angle between the first and second arms;

placing the bicycle frame bag into an opening of the bicycle frame formed on at least two sides by the two adjacent tubes of the bicycle frame by passing the first and second arms into the opening past a midpoint of the opening; and releasing the pressure to the first and second arms to position the first and second arms and the third and fourth arms along the two adjacent tubes, respectively on opposing sides of the two adjacent tubes to seat the bicycle frame bag on the bicycle.

19. The method of claim 18, further comprising engaging a fin, extending from a top of the bicycle frame bag positioned between the first and second sides, with a shock pivot support of the bicycle such that the shock pivot support is received in a recess of the fin.

20. The method of claim 18, further comprising engaging a fin, extending from a top of the bicycle frame bag positioned between the first and second sides where the fin is not directly connected to the top of the bicycle frame bag between first and second locations where it is directly connected, with a shock pivot support of the bicycle such that the fin is biased against the shock pivot support after the bicycle frame bag is seated on the bicycle.

* * * * *